(12) United States Patent
Cornelissen et al.

(10) Patent No.: US 10,358,511 B2
(45) Date of Patent: Jul. 23, 2019

(54) SEPARATION VESSELS FOR USE IN POLYMERIZATION PROCESSES AND METHODS FOR CLEANING SAME

(71) Applicant: ExxonMobil Chemical Patents Inc., Baytown, TX (US)

(72) Inventors: Philip H. Cornelissen, Heverlee (BE); Henri A. Lammens, Antwerp (BE); Fausto F. Ciancio, Veerle-Laakdal (BE); Christopher K. Morgan, Pearland, TX (US); Leo E. Reynders, Zoersel (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 27 days.

(21) Appl. No.: 15/405,939

(22) Filed: Jan. 13, 2017

(65) Prior Publication Data

US 2017/0204207 A1   Jul. 20, 2017

Related U.S. Application Data

(62) Division of application No. 13/510,828, filed as application No. PCT/US2009/069246 on Dec. 22, 2009.

(51) Int. Cl.
*C08F 110/02* (2006.01)
*C08F 10/00* (2006.01)
(Continued)

(52) U.S. Cl.
CPC .............. *C08F 110/02* (2013.01); *B01J 3/03* (2013.01); *B01J 19/02* (2013.01); *B08B 1/005* (2013.01);
(Continued)

(58) Field of Classification Search
None
See application file for complete search history.

(56) References Cited

U.S. PATENT DOCUMENTS

| 2,320,976 A | 6/1943 | McCartney |
| 3,299,033 A | 1/1967 | Douglas |

(Continued)

FOREIGN PATENT DOCUMENTS

| DE | 3604762 | 1/1987 |
| EP | 1 080 116 | 3/2001 |

(Continued)

OTHER PUBLICATIONS

U.S. Appl. No. 15/405,939, filed Jan. 13, 2017, Nicole R. Blan.

*Primary Examiner* — Nicole Blan (57) ABSTRACT

Both a system and method for cleaning a low pressure separation vessel of a high pressure polyethylene polymerization plant are provided. The system includes a polytetrafluoroethylene lining that covers the interior surfaces of the vessel, and a cover mounting assembly including an annular clamp for detachably mounting a cover over the vessel. The mounting assembly includes a clamp actuator for quickly securing and releasing the cover with respect to a top rim of the vessel. The vessel is drained of liquid polyethylene and allowed to cool to ambient temperature, thus creating a frozen "skin" of polyethylene around the interior surfaces of the vessel. The clamp actuator releases the cover. The polyethylene skin is peeled off the interior sides the vessel and gathered up at the top to form a neck, thus peeling the polyethylene skin away from the polytetrafluoroethylene lining along with any degraded polymers or other impurities that have accumulated on the interior surfaces of the vessel.

10 Claims, 9 Drawing Sheets

(51) Int. Cl.
    *B01J 3/03*     (2006.01)
    *B01J 19/02*     (2006.01)
    *B08B 1/00*     (2006.01)

(52) U.S. Cl.
    CPC ....... *C08F 10/00* (2013.01); *B01J 2219/0245* (2013.01); *B01J 2219/1946* (2013.01)

(56) References Cited

U.S. PATENT DOCUMENTS

| | | | |
|---|---|---|---|
| 3,509,115 A | 4/1970 | French | |
| 3,628,918 A | 12/1971 | Beals et al. | |
| 3,714,123 A | 1/1973 | Mancini et al. | |
| 4,175,169 A | 11/1979 | Beals et al. | |
| 4,271,280 A | 6/1981 | Tomura | |
| 4,342,853 A | 8/1982 | Durand et al. | |
| 5,068,130 A | 11/1991 | Decolibus | |
| 5,240,656 A | 8/1993 | Scheeres | |
| 5,876,568 A | 3/1999 | Kindersley | |
| 6,204,298 B1 | 3/2001 | DesMarais | |
| 6,380,329 B1 | 4/2002 | Jensen | |
| 6,613,712 B1 * | 9/2003 | McDaniel | C08F 4/65916 502/103 |
| 2003/0008400 A1 * | 1/2003 | Putnam | G01N 31/225 436/1 |
| 2003/0114607 A1 | 6/2003 | Donck | |
| 2003/0181632 A1 | 9/2003 | Mahling et al. | |
| 2004/0262287 A1 | 12/2004 | Ragan et al. | |
| 2005/0051925 A1 | 3/2005 | Gartner | |
| 2005/0272891 A1 | 12/2005 | Fourage | |
| 2007/0004814 A1 * | 1/2007 | Resconi | C08F 10/00 521/142 |

FOREIGN PATENT DOCUMENTS

| | | |
|---|---|---|
| EP | 1 162 244 | 12/2001 |
| EP | 1 529 785 | 5/2005 |
| GB | 336 339 | 10/1930 |
| GB | 1 338 280 | 11/1973 |
| GB | 1 593 661 | 7/1981 |
| WO | 2005/049664 A | 6/2005 |
| WO | 2007-018870 | 2/2007 |
| WO | 2007-018871 | 2/2007 |
| WO | WO2007068052 | 6/2007 |
| WO | 2007-134670 | 11/2007 |
| WO | 2007-134671 | 11/2007 |

* cited by examiner

SEPARATION VESSELS FOR USE IN POLYMERIZATION PROCESSES AND METHODS FOR CLEANING SAME

This application is a divisional application of Ser. No. 13/510,828, filed Jun. 13, 2012, which is a National Stage Application of International Application No. PCT/US2009/069246, filed Dec. 22, 2009, the disclosures of which are hereby incorporated by reference in their entireties.

FIELD OF THE INVENTION

This invention generally relates to a high pressure polymerization process for the manufacture of polyethylene, and is specifically concerned with a system and method for cleaning a low pressure separation vessel of a polyethylene polymerization plant that provides rapid and effective in situ removal of impurities that accumulate within the vessel.

BACKGROUND OF THE INVENTION

In the manufacture of ethylene polymers, ethylene gas is compressed into a supercritical fluid and then heated. The hot supercritical ethylene is then admitted into a tubular polymerization reactor, along with a supply of a chemical initiator and a modifier. The chemical initiator initiates polymerization of the free radical ethylene, while the modifier controls the molecular weight of the resulting polyethylene. Since only about 40% of the ethylene monomers react, the resulting polyethylene product that is discharged from the reactor is a mixture of ethylene polymers intermixed with unreacted ethylene. Consequently, it is necessary to separate the polymers from the ethylene. To this end, a high pressure separator vessel and a low pressure separator vessel are serially connected to the outlet of the polymerization reactor. The high pressure separator vessel initially receives the reactor product from the reactor at about 40,000 psi. The reactor contents are depressurized to about 4000 psi through a control valve into the high pressure separator vessel, which separates most of the polymer from the ethylene. The resulting polyethylene product still contains about 10% unreacted ethylene, and is admitted to the low pressure separator vessel. The lower pressure in this vessel results in the flashing away of the remainder of the unreacted ethylene from the product. The resulting polyethylene is then admitted into an extruder for final processing.

During processing, the outer walls of the low pressure separator vessel are continuously heated by means of a steam jacket in order to maintain the polyethylene product in a flowable liquid state. The applicants have observed that the non-Newtonian characteristics of the liquid polyethylene flowing through the low pressure separator vessel results in a very slow flow rate at the interface between the liquid polyethylene and inner surface of the vessel. The inner surface of the vessel is also where the interior temperature of the vessel is highest due to its closeness to the steam jacket that surrounds the exterior of the vessel. The combination of the high temperature of the vessel inner surface and the long residence time of the liquid polyethylene over it results in the production of degraded polymers on the inner surface due to thermally-induced, cross-linking reactions. If these degraded polymers are not periodically removed from the inner surfaces of the low pressure separator vessel, they can contaminate the final polyethylene product and degrade its appearance and film properties. The problem is worse in situations where a high clarity and purity polyethylene product is essential for the rendering of a particular final product, such as blown film products, medical applications and sensitive electrical applications.

To solve this problem, polyethylene manufacturers typically periodically clean the inner walls of the low pressure separator vessel by hydroblasting every several months. But because hydroblasting takes several days and must be done with the vessel in a horizontal position, most polyethylene manufactures replace the fouled low pressure separator vessel with a pre-cleaned, substitute separator vessel in order to reduce system downtime. Unfortunately, such a vessel replacement procedure still takes about a day to implement due to the time required to (1) mechanically disconnect all of the interfaces of the fouled vessel with the other components of the polymerization plant, (2) exchange the multi-ton fouled vessel with a multi-ton cleaned vessel and (3) to re-connect all of the interfaces between the clean vessel and the polymerization plant. Moreover, as the vessel weighs one or more tons, the step of exchanging the fouled vessel with a cleaned vessel must be done by way of a slow and delicate crane operation in order to avoid breakage or damage to the valves, pipes and other interface fittings that must be disconnected and reconnected.

SUMMARY OF THE INVENTION

Clearly, there is a need for an improved cleaning technique for a low pressure separator vessel that is faster and that reduces the amount of downtime of the polymerization plant. Ideally, such a technique would be easier and less expensive to implement, and would reduce the amount of downtime for cleaning operations necessary to maintain a high quality polyethylene product.

The invention is a system and method for cleaning a separation vessel that fulfills all of the aforementioned needs. To this end, the system of the invention generally comprises a low-stick lining, preferably a polytetrafluoroethylene lining, that covers at least a portion of the interior surfaces of the vessel, and a detachable cover mounting assembly including a clamp for detachably mounting a cover over the vessel in a pressure-tight relationship. "Low-stick" for purposes of this specification and appended claims means a lining producing a reduced tendency for polymer product, such as polyethylene or polypropylene, to adhere to a surface so lined as compared to a surface without such low-stick lining. The system may include a layer of metal applied over the interior surfaces of the vessel to provide adhesion between the polytetrafluoroethylene lining and the interior surfaces of the vessel. The vessel lining is preferably a layer (i.e., film) of polytetrafluoroethylene having a dry film thickness that is preferably between about 0.02 and 0.20 mm, and the metal layer is preferably a nickel layer between about 0.050 and 0.150 mm thick. As used herein "dry film thickness" means the thickness of the film after it has thoroughly dried (e.g., after all the solvent has evaporated and the film has cured). The mounting assembly includes a clamp actuator that secures and releases the clamp into and out of a clamping position. The cover and the top rim of the vessel may each include annular flanges which the clamp may capture and pull together when actuated into the clamping position. The clamp actuator may include one or more hydraulic cylinders that can rapidly secure and release the clamp into and out of a clamping position. The mounting assembly preferably further includes a gasket that provides a pressure-tight seal between the cover and the vessel when the clamp is secured by the clamp actuator. The system may further include a hoist for removing an impurity-laden layer of polyethylene skin off of the polytetrafluoroethylene lining that covers the interior surfaces of the vessel, and a scraping tool, such as a wooden spatula, for initiating the peeling of a polyethylene skin off of the interior sides of the vessel.

In the method of the invention, the low pressure vessel is emptied of liquid polyethylene and the pressurized ethylene gas is bled off and recycled into the reactor until ambient pressure is achieved. The vessel is then cooled through, e.g., exposure to the environment or, preferably, by circulating cooling water through the heat exchanger panels on the vessel exterior, to substantially ambient temperature, which freezes the liquid polyethylene clinging to the interior surfaces of the vessel into a skin of solid polyethylene. The clamp is then detached from the cover, which allows the cover to be quickly removed from the top of the vessel. The polyethylene skin is next peeled off of the sides of the low pressure vessel and gathered up at the top to form a neck, which in turn is connected to the hoist of the system. The hoist lifts the knot upwardly, which peels the polyethylene skin away from the polytetrafluoroethylene lining along with any impurities that have accumulated on the interior surfaces of the vessel. The hoist lifts the resultant bag-like polyethylene skin completely out of the vessel, thereby completing the cleaning of the vessel. The cover is then re-positioned over the top end of the vessel, and the clamp is re-attached over the cover and the upper rim of the vessel to create a pressure-tight seal between the cover and the vessel. The reactor is re-activated and the vessel is put back into production.

The cleaning process of the invention requires only about 2 hours to perform, in contrast to the full day required by the prior art method. Moreover, the invention obviates the need for two separate low pressure separator vessels, and does not require disconnection and lifting and lowering steps that can damage the vessel. Finally, the polytetrafluoroethylene lining that covers the interior surfaces of the vessel and, optionally, the cover, not only results in more thorough cleaning when the polyethylene skin is lifted off of the interior surfaces, but also promotes a higher degree of flow on the inner surfaces of the vessel during the manufacture of the polyethylene, thus reducing the number of vessel cleanings required to maintain a high quality product.

BRIEF DESCRIPTION OF THE DRAWINGS

FIG. 1 is a schematic drawing of a polyethylene plant having a low pressure separator vessel that the system of the invention is applied to.

DETAILED DESCRIPTION OF THE INVENTION

Figure 1:
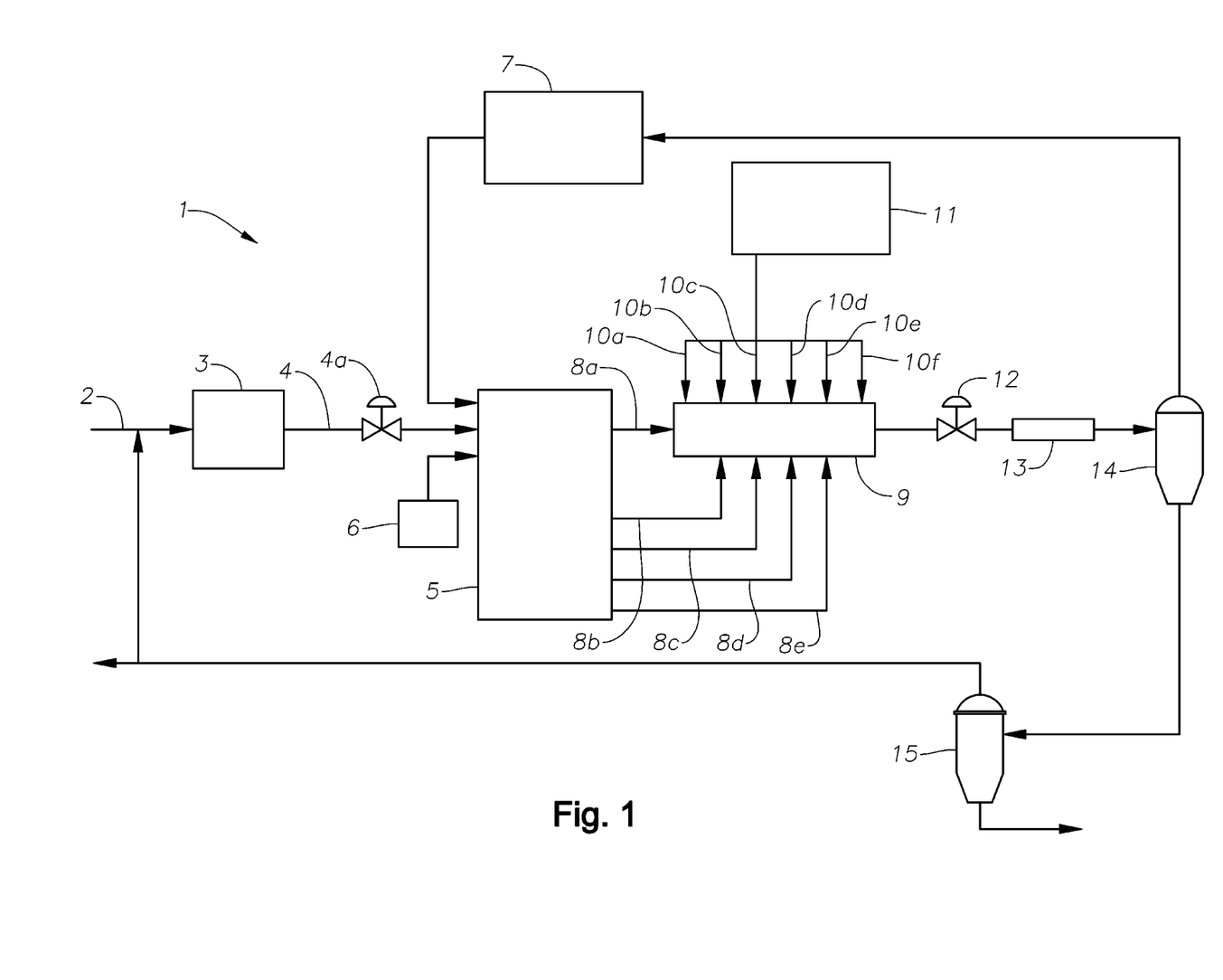

FIG. 1 is a schematic of a polymerization plant 1 of the type that includes the low pressure separator vessel 15 that the cleaning system and method are applied to. The low pressure separator vessel typically operates at a pressure in the range of from 0.1 to 20 barg, more preferably from 0.1 to 5 barg, yet more preferably from 0.1 to 2 barg and especially preferably from 0.1 to 0.9 barg (barg =bar gauge, that is, pressure in excess of atmospheric). The plant 1 includes an ethylene feed line 2 which supplies fresh ethylene to a primary compressor 3. The ethylene discharged from the primary compressor 3 flows via conduit 4 having a valve 4a to a secondary compressor 5. Also entering the secondary compressor 5 is a stream of fresh modifier(s) and/or optional comonomer(s) and a stream of recycled ethylene. The fresh modifier stream is supplied by a separate modifier pump 6. The recycled ethylene comes from the high pressure recycle system 7.

The secondary compressor 5 discharges compressed ethylene in five streams 8a, 8b, 8c, 8d, and 8e. Stream 8a accounts for 20% of the total ethylene flow. Stream 8a is heated by a steam jacket (not shown) which heats the ethylene, prior to entry into the front end of the tubular reactor 9. The four remaining ethylene side streams 8b, 8c, 8d, and 8e each enter the reactor as sidestreams. Sidestreams 8b, 8c, 8d, and 8e are cooled. The tubular reactor 9 is also shown with six initiator inlets 10a to 10f which are spaced at intervals along reactor 9 and are fed from an initiator mixing and pumping station 11.

Downstream of the sixth initiator inlet 10f and the sixth reaction zone, the tubular reactor terminates in a high-pressure, let-down valve 12. The high-pressure, let-down valve 12 controls the pressure in the tubular reactor 9. Immediately downstream of the high-pressure, let-down valve 12 is product cooler 13. Upon entry to the product cooler 13, the reaction mixture is in a phase-separated state. It exits into high pressure separator 14. The overhead gas from the high pressure separator 14 flows into the high pressure recycle system 7 where the unreacted ethylene is cooled and returned to the secondary compressor 5.

The polymer product flows from the bottom of the high pressure separator 14 into the low pressure separator 15, separating almost all of the remaining ethylene from the polymer. That remaining ethylene is transferred either to a flare (not shown) or a purification unit (not shown) or is recycled via the primary compressor 3 from the product separation unit to the secondary compressor. Molten polymer flows from the bottom of the low pressure separator 15 to an extruder (not shown) for extrusion, cooling and pelletizing.

Figure 2:
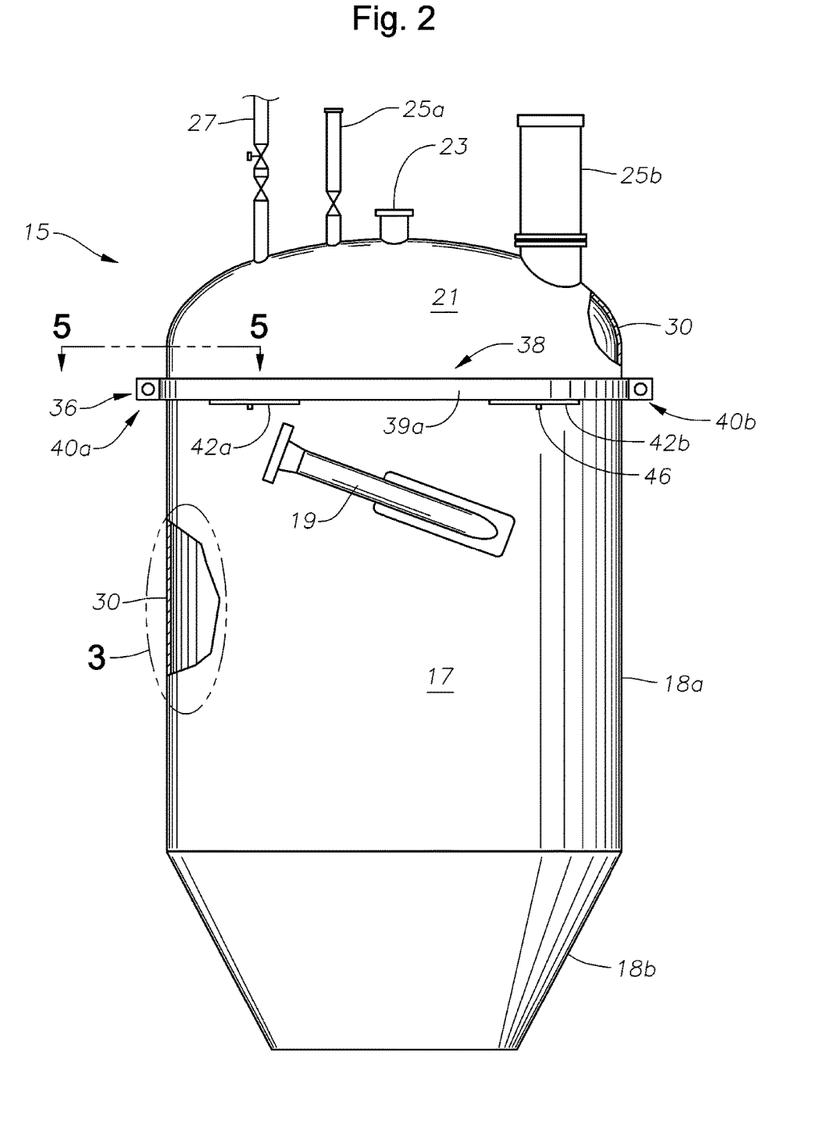
FIG. 2 is an enlarged side view of the low pressure separator vessel shown in FIG. 1.

With reference now to FIG. 2, the separator vessel 15 includes a vessel body 17 having a product inlet 19 mounted on its side for receiving the polymer product from the high pressure separator 14. Vessel body 17 includes a cylindrical section 18a that ends in a frustro-conical section 18b at its bottom that functions to funnel purified liquid polyethylene into an extruder (not shown). The cylindrical section 18a is surrounded by a steam jacket (not shown) that continuously applies heat to the vessel 15 during production to maintain the polyethylene product in liquid form. The vessel 15 further includes a cover 21 that is sealingly mountable over the top rim of the vessel body. Cover 21 includes an overhead gas outlet 23 for conducting pressurized ethylene gas either back to the primary compressor 3 for recycling or to a flare or purification unit. Cover 21 further includes small and large rupture discs 25a, 25b for relieving smaller or larger excess pressures in order to avoid a catastrophic bursting of the vessel 15. Finally, the cover 21 includes a nitrogen purge line 27 for replacing air in the vessel with inert nitrogen prior to putting the vessel on-line, thereby avoiding any degradation of the polyethylene product as a result of oxidation. The diameter of the vessel body 17 can range between 5 and 15 feet (1.52 and 4.57 meters), while the length of the vessel body can range between 10 and 40 feet (3.05 and 12.2 meters).

Figure 3:
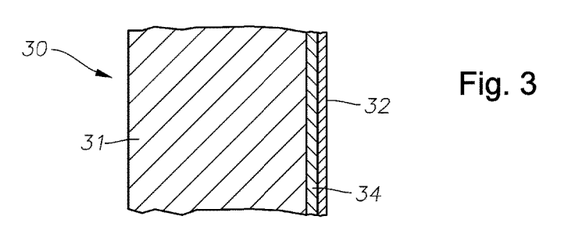
FIG. 3 is an enlarged view of the cross section of the vessel wall area circled in phantom in FIG. 2, illustrating both the polytetrafluoroethylene lining and nickel coating of the system of the invention.

With reference now to FIG. 3, the walls 30 of both the vessel body 17 and the cover 21 may be formed from a curved plate 31 of either carbon steel or stainless steel. The cleaning system of the invention includes a layer or lining 32 of a chemical having anti-stick characteristics with respect to polyethylene over the inner surface of the walls 30. Preferably, layer 32 is comprised of polytetrafluoroethylene having a dry film thickness between about 0.02 and 0.20 mm. More preferably, the dry film thickness of the polytetrafluoroethylene layer 32 of the vessel body 17 is between about 0.02 and 0.07 mm, while the dry film thickness of the polytetrafluoroethylene lining 32 of the cover 21 is between about 0.04 and 0.15 mm. The preferred dry film thickness of the polytetrafluoroethylene lining 32 of the cover 21 is greater due to the presence of more tightly curved surfaces than the inner surface of the walls 30 of the vessel body 17. When the steel plate 31 forming the walls is formed from carbon steel, a layer 34 of a corrosion-resistant metal 37, such as nickel is applied over the surface of the inner walls 30 to provide a surface that the polytetrafluoroethylene layer 32 can adhere to. Without such a layer 34, the rust, corrosion and pitting that invariably forms on the surface of carbon steel over time would provide sites where the polytetrafluoroethylene layer 32 would start peeling off of the inner surfaces of the walls 30. Such a layer 34 of nickel is preferably applied by electrodeposition to a thickness between about 0.050 and 0.150 mm. When the steel plate 31 forming the walls is formed from stainless steel, no layer 34 of a corrosion-resistant metal is necessary, and the polytetrafluoroethylene layer 32 is applied directly over the inner surface of such stainless steel plate with good adherence. The optional inclusion of the layer 34 of a corrosion-resistant metal in the system of the invention advantageously allows the system to be retrofitted onto carbon steel, low pressure separator vessels 15 used in older polyethylene plants.

Figure 4A:
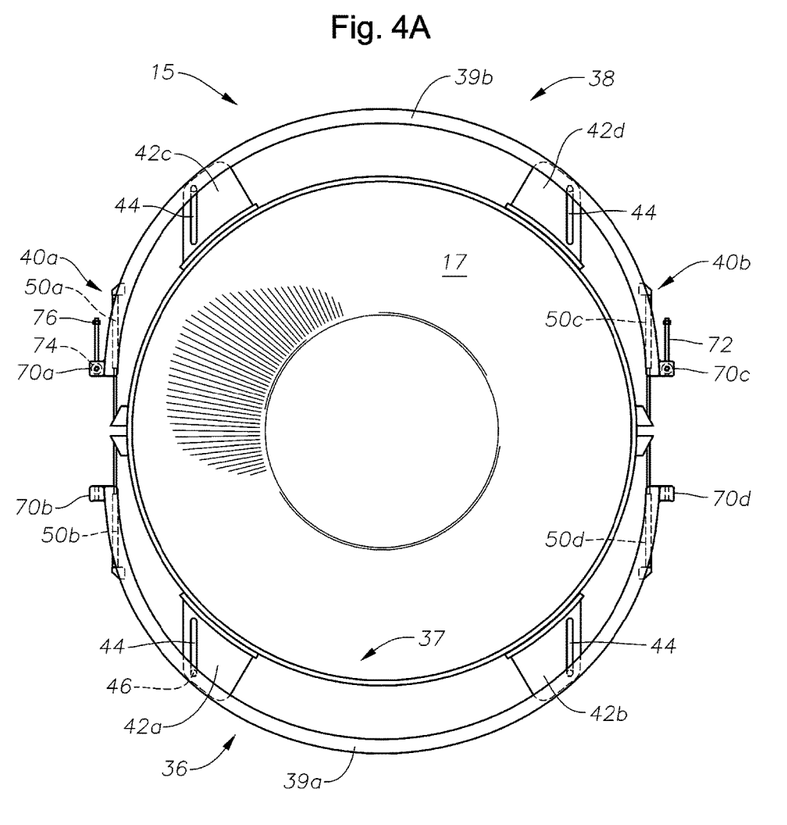
FIG. 4A and FIG. 4B are different views of the low pressure separator vessel shown in FIG. 1 with the cover removed, illustrating the cover mounting assembly in a closed state in solid lines and in an open state in phantom lines.
Figure 4B:
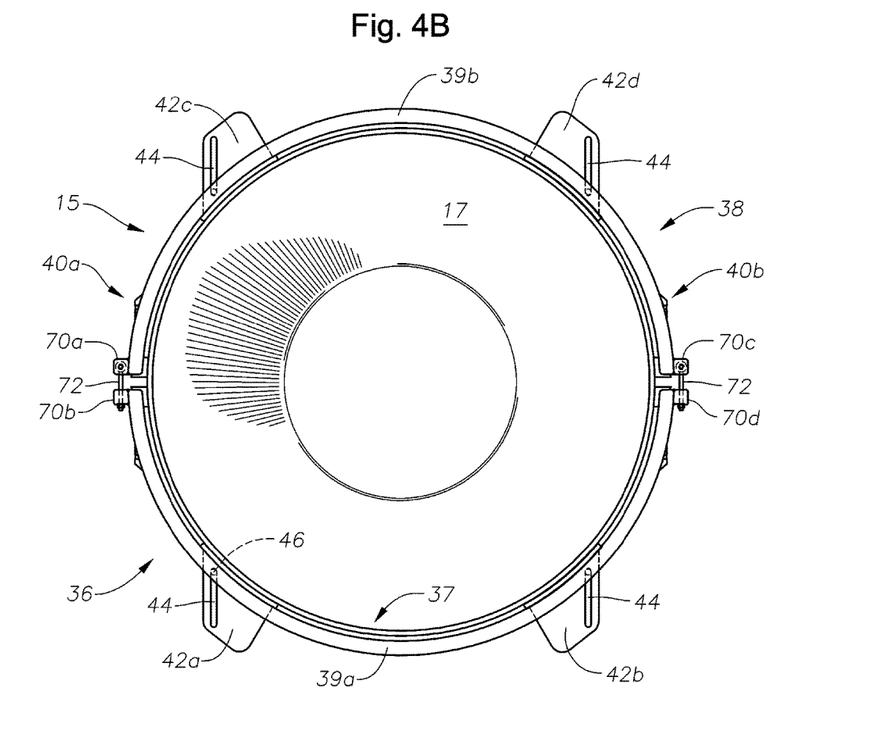

With reference to FIG. 4, the cleaning system further includes a cover mounting assembly 36 for detachably and sealingly mounting the cover 21 to the upper rim 37 of the vessel body 17. To this end, the cover mounting assembly 36 includes a clamp 38 formed from a pair of opposing, semicircular clamp members 39a, b that are movable into and out of a clamping position by means of a pair of hydraulically-controlled clamp actuators 40a, b. The semicircular clamp members 39a and 39b are supported by a pair of brackets 42a, b and 42c, d, respectively. Each of the support brackets 42a, b and 42c, d includes a slot 44 which slidably receives a guide pin 46 connected to one of the clamp members 39a, b. Each of the clamp actuators 40a,b includes a pair of hydraulic pistons 50a, b and 50c, d for moving the semicircular clamp members 39a and 39b from a non-clamping position (illustrated in phantom) that allows the cover 21 to be lifted off the rim 37 to a clamping position (illustrated in solid lines) that sealingly mounts the cover 21 over the upper rim 37. The slidable engagement between the guide pins 46 and the slots 44 in the support brackets 42a, b and 42c, d confines the movement of the semicircular clamp members 39a, b between the positions illustrated in FIG. 4 when the hydraulic pistons 50a, b and 50c, d of the clamp actuators 40a, b are operated.

Figure 5:
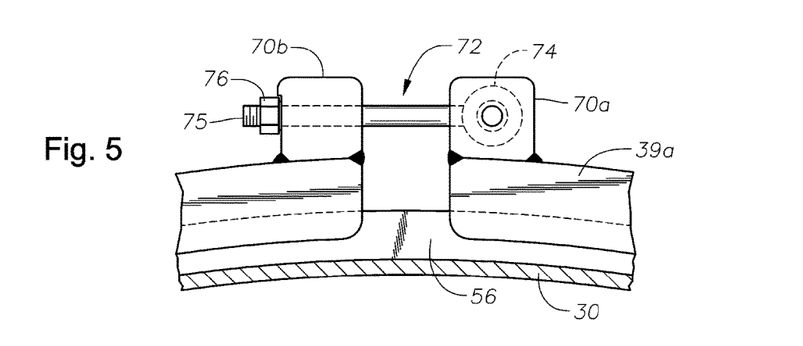
FIG. 5 is an enlarged view of an end of the cover mounting assembly along the line 5-5 in FIG. 2, illustrating the relationship between the annular flange that circumscribes the upper rim of the vessel, the clamp of the cover mounting assembly, and the clamp securing bolt.
Figure 6A:
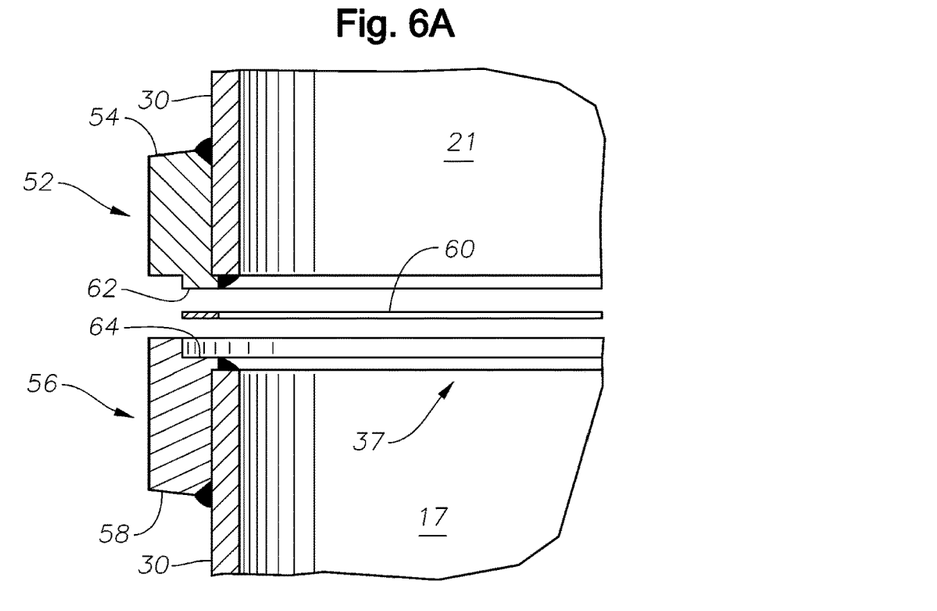
FIG. 6A is a partial, side cross sectional view of the cover mounting assembly shown in an open state without the clamp.
Figure 6B:
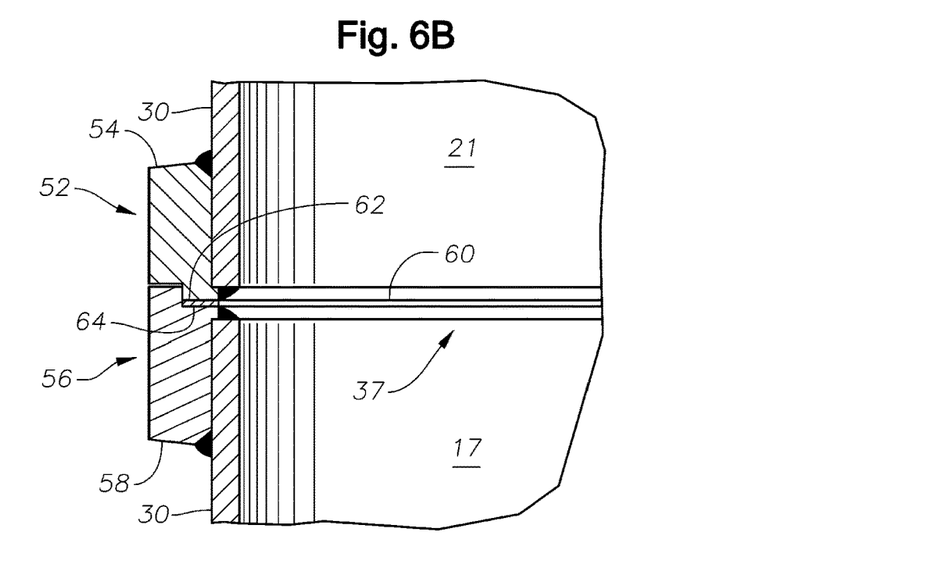
FIG. 6B is a partial, side cross sectional view of the cover mounting assembly shown in a closed state without the clamp.

As is illustrated in FIGS. 5 and 6A, the cover mounting assembly 36 further includes annular flanges 52 and 56 circumscribing the bottom rim of the cover 21 and the top rim 37 of the vessel body 17, respectively. The top wall 54 of annular flange 52 and the bottom wall 58 of the annular flange 56 are slightly tapered in opposite directions as shown. A ring-shaped gasket 60 is provided between the bottom rim of the cover 21 and the top rim 37 of the vessel body 17. The lower wall of the annular flange 52 terminates in a circular lip 62 that is complementary in shape to an annular recess 66 present in the upper wall of the annular flange 56B. When the cover 21 is positioned over the rim 37 of the vessel body 17, the gasket 60 is seated between the circular lip 62 of the annular flange 52 and the annular recess 66 of the annular flange 56, as is shown in FIG. 6B.

Figure 6C:
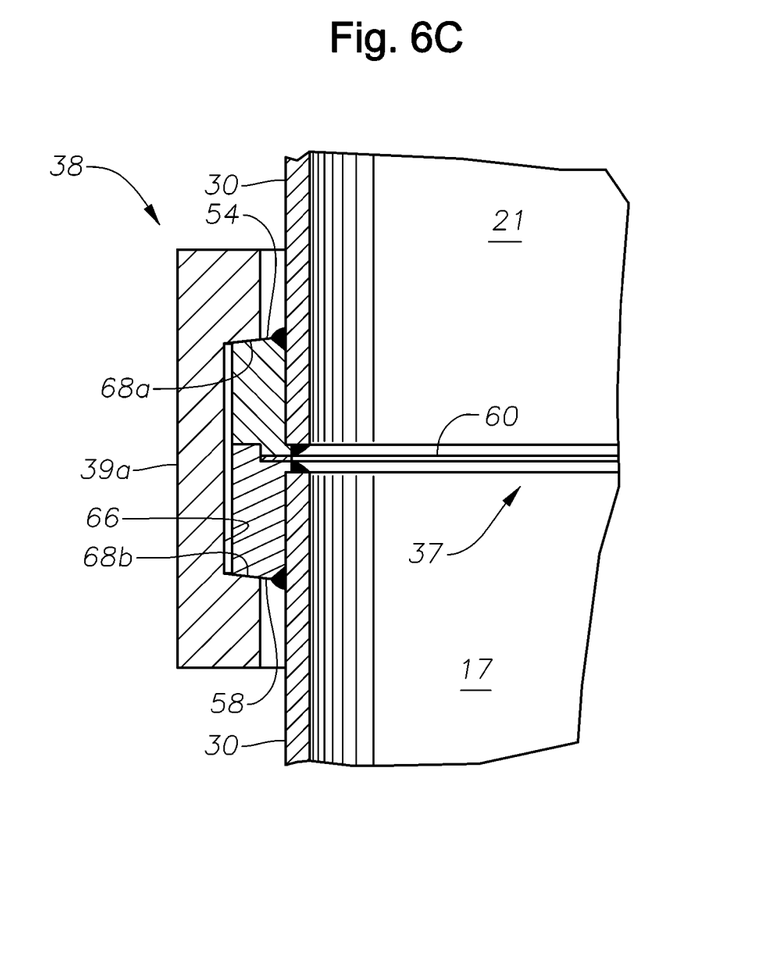
FIG. 6C illustrates the cover mounting assembly shown in FIG. 6B with the clamp.

FIG. 6C illustrates how the clamp 38 of the cover mounting assembly 36 compresses the gasket 60 between the circular lip 62 and the annular recess 66. Specifically, each of the semicircular clamp members 39a, b includes an annular recess 66 having opposing inner side walls 68a, b which are slightly tapered at the same angles as the top wall 54 of the annular flange 52 and the bottom wall 58 of the annular flange 56. Consequently, when the hydraulic pistons 50a-d of the cover mounting assembly 36 are actuated to retract the clamp 38 into the clamping position illustrated in FIG. 4, the inner side walls 68a, b wedgingly engage the top wall 54 and the bottom wall 58 to squeeze the upper and lower annular flanges 54 and 58 together, thereby compressing the gasket 60 into sealing engagement between the circular lip 62 and annular recess 66.

Finally, in order to lock the semicircular clamp members 39a, b into the clamping position shown in FIG. 4, the cover mounting assembly 36 includes a combination of mounting lugs 70a-d and locking bolts 72, as best seen in FIG. 5. Each of the locking bolts 72 includes a ring-shaped end 74 pivotally mounted in each of the lugs 70a and 70c, and a threaded end 75 receivable into a recess in each of the lugs 70b and 70d. When the hydraulic pistons 50a-d are actuated, both of the locking bolts 72 may be pivoted into the position illustrated in FIG. 4. A locking nut 76 may then be screwed over the threaded ends 75 in order to maintain the semicircular clamp members 39a, b in the clamping position after the hydraulic pistons are de-actuated. To restore the semicircular clamp members 39a, b back into the unclamping position, the opposite procedure is followed with the locking bolts 72 and the hydraulic pistons 50a-d are actuated to withdraw the semicircular clamp members 39a, b back into the position illustrated in phantom in FIG. 4.

In addition to the previously-described cleaning system, the invention also includes a method for cleaning the low pressure separator vessel 15 of a polyethylene plant 1. In the first steps of the cleaning method, the plant 1 is shut down, and an isolation valve (not shown) is closed that prevents a further flow of polyethylene product into the inlet 19 of the vessel body. The polypropylene product within the vessel 15 is allowed to drain out of the frustro-conical section 18b at its bottom into the extruder.

While the vast majority of the polyethylene product will exit the vessel during the drainage step, some of the product will cling to the inner walls 30 of both the vessel body 17 and the cover 21 due the previously described non-Newtonian flow characteristics of the liquid polypropylene. After the drainage step is completed, another valve (also not shown) is opened to vent the overhead gas outlet 23 of the cover 21 to atmospheric pressure. At the same time, cold water is circulated through the steam jacket that surrounds the vessel body 17 to "freeze" the remaining polypropylene into a skin layer 80 that covers the polytetrafluoroethylene layer 32 that lines the inner surfaces of the walls 30.

Figure 7:
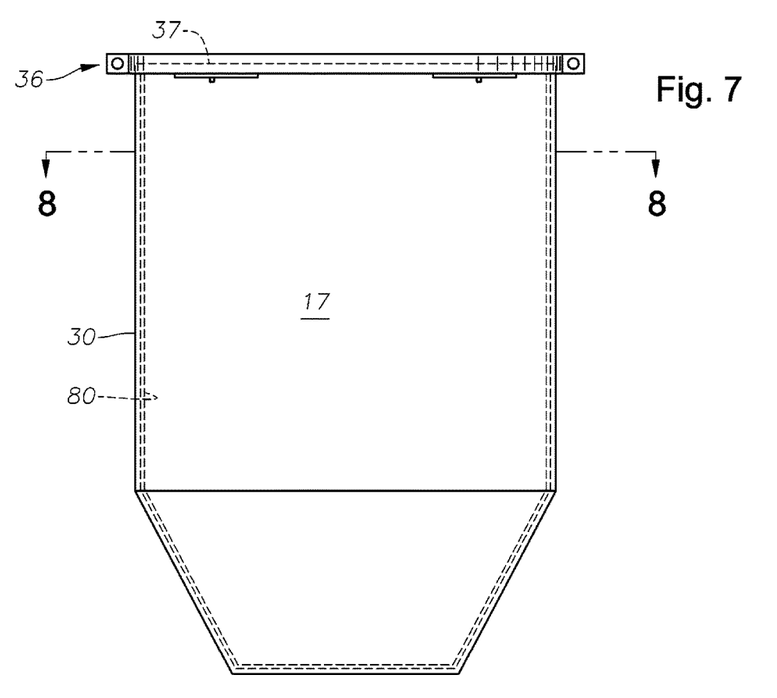
FIG. 7 illustrates the initial steps of the cleaning method of the invention after the cover of the vessel has been removed to provide access to a polyethylene skin that has hardened over the inner surface of the vessel.

After the vessel 15 has cooled to ambient temperature, the nuts 76 of the locking bolts 72 are removed and the bolts 72 are pivoted into the unlocking position illustrated in FIG. 4. The hydraulic pistons 50a-d of the cover mounting assembly 15 are actuated to withdraw the semicircular clamp members 39a, b back into the unclamping position illustrated in phantom in FIG. 4. The cover 21 is then removed, as is illustrated in FIG. 7, and the skin layer 80 lining the inner surface of the cover 21 is manually peeled away and removed.

Figure 8:
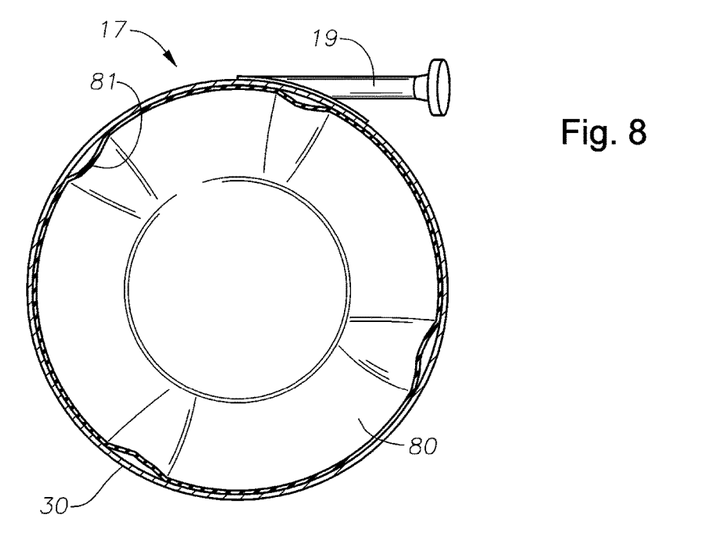
FIG. 8 is a top, cross sectional view of the vessel along the line 8-8, illustrating how the polyethylene skin dimples away from the inner surface of the low pressure separator vessel as a result of the cover being removed.
Figure 9:
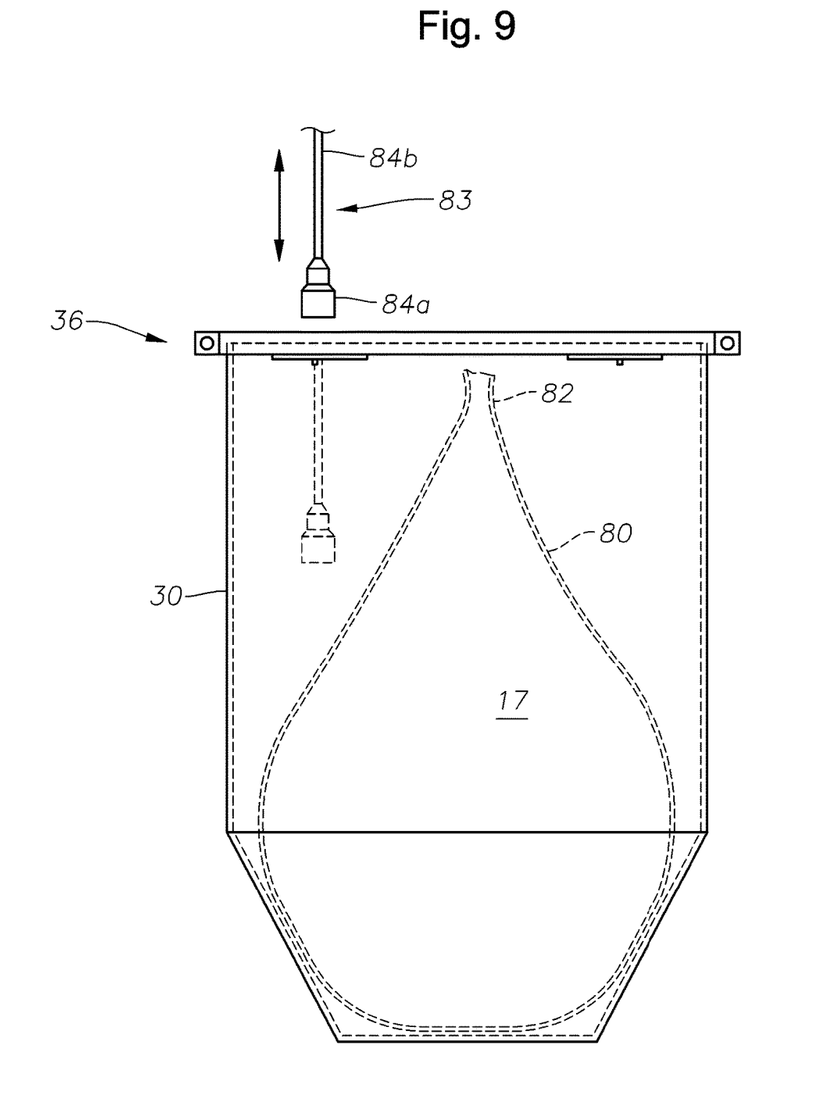
FIG. 9 illustrates the cleaning method steps of separating the polyethylene skin from the inner surfaces of the vessel with spatulas and gathering the top of the skin into a neck.
Figure 10:
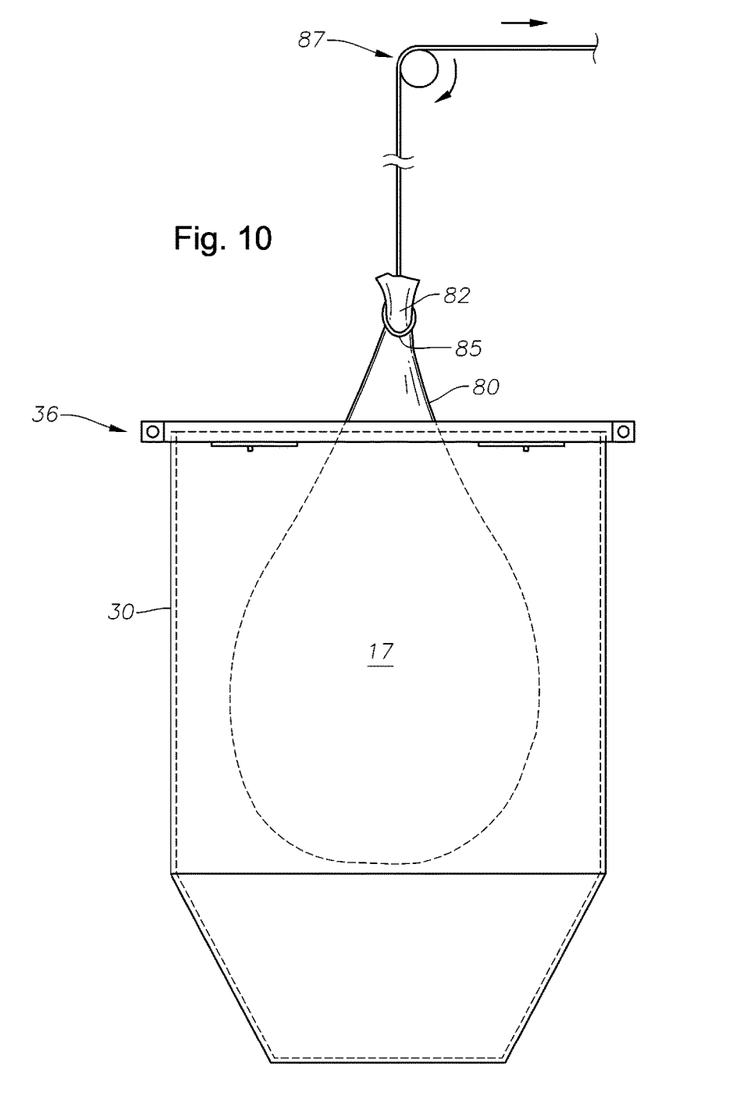
FIG. 10 illustrates the final steps of cleaning method of the invention of lifting polyethylene skin from the inner surfaces of the vessel with a hoist.

As is best seen in FIG. 8, when the cover 21 is removed, the skin 80 (which is between about 1.5 and 3.0 cm thick) is torn long the interface between the cover 21 and the upper rim 37 of the vessel body 17. The tearing forces create separations 81 between the inner surfaces of the vessel walls 30 and the skin 80. With reference to FIG. 9 and FIG. 10, these separations advantageously create starting points where the skin 80 may be peeled back from the inner surfaces of the vessel walls 30 and gathered at its upper end into a neck 82. Specifically, spatulas 83 formed by a wedge-like, wooden head 84a connected to a long handle 84b are inserted into the areas of separation 81 in order to separate the skin 80 from the vessel walls 30 such that the skin 80 forms a continuous mass (e.g., a bag-like structure) that terminates at its upper end in the neck 82. After the skin separation step has been completed, a noose 85 is lowered by means of a hoist 87 and is secured around the neck 82 of the bag-like structure of skin 80. The hoist is then raised to completely remove the bag-like structure of skin 80, which of course includes all of the degraded polymers that have accumulated over the inner surfaces of the vessel body 17 over time. The cover 21 is then re-attached over the top rim 37 of the vessel body 17 by the actuation of the hydraulic pistons 50a-d, the locking bolts 72 are locked in place, the overhead gas outlet 23 is reconnected to the recycling line shown in FIG. 1. Nitrogen is next admitted through the nitrogen purge line 27 to displace atmospheric oxygen out of the vessel 15. The plant 1 is re-started, and the product inlet 19 is re-opened.

While the system and method of this invention have each been described with respect to a preferred embodiment, numerous modifications, equivalences and variations of this invention will become evident to persons of skill in the art. All such modifications, equivalences and variations are encompassed within the scope of this invention, which is limited only by the appended claims and their equivalences.

The invention claimed is:

1. A method for removing polymer from a low pressure separation vessel in a high pressure polymerization plant comprising:
   providing a low pressure separation vessel which had been in operation as part of a high pressure polymerization process, said vessel comprising:
   i) a detachable cover,
   ii) a low-stick lining that covers at least a portion of the interior surfaces of the vessel, said low-stick lining producing a reduced tendency for polymer product to adhere to a surface so lined as compared to a surface without such low-stick lining, and
   iii) a liquid polymer, comprising at least one of polyethylene or polypropylene, which is the reaction product of the high pressure polymerization process;
   removing the detachable cover from the low pressure separation vessel; emptying the low pressure separation vessel of the liquid polymer;
   cooling the low pressure separation vessel an amount sufficient to freeze the liquid polymer clinging to the interior surfaces of the low pressure separation vessel to form a skin layer of the liquid polymer, wherein the skin layer is disposed on the low-stick lining; and
   removing the skin layer from the low pressure separation vessel.

2. The method of claim 1, wherein the low pressure separation vessel receives a stream of the liquid polymer and the method further comprises stopping the stream of the liquid polymer to the low pressure separation vessel prior to removing the detachable cover and/or emptying the low pressure separation vessel of at least a portion of the liquid polymer.

3. The method of claim 1, wherein the skin layer forms a continuous mass in the low pressure separation vessel.

4. The method of claim 3, wherein the continuous mass is removed from the low pressure separation vessel using a hoist.

5. The method of claim 1, wherein the low-stick lining comprises a layer of polytetrafluoroethylene.

6. The method of claim 5, wherein the low-stick lining comprises both a layer of polytetrafluoroethylene and a layer of nickel, and the layer of polytetrafluoroethylene is disposed on the layer of nickel.

7. The method of claim 6, wherein the layer of nickel has a thickness from about 0.050 and 0.150 mm.

8. The method of claim 5, wherein the layer of polytetrafluoroethylene has a thickness from about 0.02 and 0.20 mm.

9. The method of claim 1, wherein the cooling comprises cooling the low pressure separation vessel to substantially ambient temperature.

10. A method for production of polyolefin polymers comprising the method of claim 1.

* * * * *